(12) United States Patent
Wacha

(10) Patent No.: US 7,140,147 B2
(45) Date of Patent: Nov. 28, 2006

(54) METAL LIP JIG RIG

(76) Inventor: Willard C. Wacha, 187 Cascade Rd., Warwick, NY (US) 10990

(*) Notice: Subject to any disclaimer, the term of this patent is extended or adjusted under 35 U.S.C. 154(b) by 0 days.

(21) Appl. No.: 10/658,337

(22) Filed: Sep. 10, 2003

(65) Prior Publication Data

US 2004/0045211 A1 Mar. 11, 2004

Related U.S. Application Data

(63) Continuation-in-part of application No. 09/855,680, filed on May 16, 2001, now Pat. No. 6,305,118.

(60) Provisional application No. 60/233,662, filed on Sep. 19, 2000.

(51) Int. Cl.
*A01K 85/00* (2006.01)

(52) U.S. Cl. .................... 43/42.47; 43/42.39; 43/42.52

(58) Field of Classification Search ............ 43/42.24, 43/42.28, 42.47, 42.1, 42.08, 42.05, 42.36, 43/42.37, 42.39, 42.5, 42.52, 44.8, 44.2
See application file for complete search history.

(56) References Cited

U.S. PATENT DOCUMENTS

| | | | | |
|---|---|---|---|---|
| 1,620,589 A | * | 3/1927 | Ackerman | 43/44.8 |
| 1,709,010 A | * | 4/1929 | Foss | 43/42.47 |
| 1,888,641 A | * | 11/1932 | Toepper | 43/42.52 |
| 1,924,350 A | * | 8/1933 | Cordell | 43/42.5 |
| 1,997,900 A | * | 4/1935 | Edwards | 43/42.47 |
| 2,005,554 A | * | 6/1935 | Milner | 43/42.47 |
| 2,019,959 A | * | 11/1935 | Frevert | 43/42.52 |
| 2,119,805 A | * | 6/1938 | Davenport | 43/42.52 |
| 2,205,472 A | * | 6/1940 | Fagerholm | 43/42.52 |
| 2,218,259 A | * | 10/1940 | Finucan | 43/42.5 |
| 2,254,981 A | * | 9/1941 | Sisco | 43/42.52 |
| 2,449,692 A | * | 9/1948 | Eichendorff | 43/44.2 |
| 2,461,755 A | * | 2/1949 | Miller | 43/44.8 |
| 2,476,126 A | * | 7/1949 | Weiss | 43/44.2 |
| 2,486,626 A | * | 11/1949 | Arbogast | 43/42.47 |
| 2,518,213 A | * | 8/1950 | Wood | 43/42.47 |
| 2,538,703 A | * | 1/1951 | Elwood | 43/42.5 |
| 2,573,018 A | * | 10/1951 | Herrick | 43/44.8 |
| 2,597,317 A | * | 5/1952 | Gross | 43/42.5 |
| 2,632,276 A | * | 3/1953 | Hale | 43/44.2 |
| 2,700,240 A | * | 1/1955 | Gibbs | 43/42.52 |
| 2,812,609 A | * | 11/1957 | Lema | 43/42.52 |
| 2,821,046 A | * | 1/1958 | Fisk | 43/44.2 |
| 2,836,922 A | * | 6/1958 | Cox | 43/44.2 |

(Continued)

FOREIGN PATENT DOCUMENTS

WO WO 97/09875 3/1997

OTHER PUBLICATIONS

Catalog entitled, "Stamina Quality Components," Brooklyn Park, MN, Summer 2004 (Cover and pp. 45-46).*

(Continued)

*Primary Examiner*—Darren W. Ark
(74) *Attorney, Agent, or Firm*—Heslin Rothenberg Farley & Mesiti PC; John Pietrangelo

(57) ABSTRACT

A metal lip jig rig that has a metal lip with raised edges to help the metal lip jig rig sink and wobble when reeled in or let out in water. The metal lip jig rig can be used with a number of fishing lure accessories such as artificial and live bait, feathers, Chenalle wire, spinner wire and other common fishing lure accessories. The metal lip jig rig is designed to replace lead split shot sinkers and lead jigs and can be used with a spinning rod, a fly rode, a bait rod or a deep sea rod.

20 Claims, 6 Drawing Sheets

U.S. PATENT DOCUMENTS

| | | | | |
|---|---|---|---|---|
| 2,871,611 A | * | 2/1959 | Shepard, Jr. | 43/44.2 |
| 2,900,754 A | * | 8/1959 | Orlik | 43/42.47 |
| 2,908,104 A | * | 10/1959 | Hutchins et al. | 43/42.52 |
| 3,187,457 A | * | 6/1965 | Karisch | 43/42.47 |
| 3,248,820 A | * | 5/1966 | Mirabeau | 43/42.39 |
| 3,284,945 A | * | 11/1966 | Kurtis | 43/44.2 |
| 3,293,790 A | * | 12/1966 | Konomos | 43/44.2 |
| 3,344,549 A | * | 10/1967 | Peters et al. | 43/42.47 |
| 3,410,020 A | * | 11/1968 | McClellan et al. | 43/42.47 |
| 3,628,276 A | * | 12/1971 | Coalson | 43/42.36 |
| 3,731,419 A | * | 5/1973 | Candy | 43/44.8 |
| 3,738,046 A | * | 6/1973 | Johnson | 43/42.47 |
| 4,126,956 A | * | 11/1978 | Bayer | 43/44.2 |
| 4,367,607 A | * | 1/1983 | Hedman | 43/44.8 |
| 4,594,806 A | * | 6/1986 | Brown | 43/42.5 |
| 4,660,318 A | * | 4/1987 | Mieno | 43/42.39 |
| 4,765,086 A | * | 8/1988 | Schultz | 43/42.52 |
| 4,862,629 A | * | 9/1989 | Ryan | 43/42.47 |
| 4,893,431 A | * | 1/1990 | Ehlers | 43/42.47 |
| 5,062,236 A | * | 11/1991 | Fish | 43/42.52 |
| 5,063,705 A | * | 11/1991 | Pool | 43/44.2 |
| 5,077,931 A | * | 1/1992 | Marshall | 43/44.8 |
| 5,157,859 A | | 10/1992 | Wirkus | 43/42.37 |
| 5,216,830 A | * | 6/1993 | Brott, II | 43/42.39 |
| 5,218,778 A | * | 6/1993 | Szantor | 43/42.52 |
| 5,279,065 A | * | 1/1994 | Drury, Jr. | 43/42.52 |
| 5,490,346 A | * | 2/1996 | Guest | 43/42.24 |
| 5,548,920 A | * | 8/1996 | Peddycoart | 43/44.2 |
| 5,588,247 A | * | 12/1996 | Wicht | 43/42.28 |
| 5,918,406 A | * | 7/1999 | Wilson | 43/42.28 |
| 5,992,085 A | * | 11/1999 | Schultz et al. | 43/44.8 |
| 6,041,540 A | | 3/2000 | Potts | 43/42.24 |
| 6,073,384 A | * | 6/2000 | Schlaegel | 43/42.5 |
| 6,094,856 A | * | 8/2000 | Sam | 43/42.5 |
| 6,108,964 A | * | 8/2000 | Noorlander | 43/42.5 |
| 6,141,900 A | * | 11/2000 | Rudolph | 43/42.47 |
| 6,505,432 B1 | * | 1/2003 | Brinkman | 43/42.37 |
| 6,658,785 B1 | * | 12/2003 | Faulkner et al. | 43/44.2 |
| 2001/0045048 A1 | * | 11/2001 | Johnson | 43/42.39 |
| 2005/0246940 A1 | * | 11/2005 | Jones et al. | 43/42.5 |

OTHER PUBLICATIONS

Catalog entitled, "Stamina Quality Components," Brooklyn Park, MN, Summer 2004 (Cover and pp. 45-46).

* cited by examiner

METAL LIP JIG RIG

CROSS-REFERENCE TO RELATED APPLICATION

This application is a continuation-in-part of application Ser. No. 09/855,680 filed May 16, 2001, now U.S. Pat. No. 6,305,118, which claims the benefit of U.S. Provisional Patent Application Ser. No. 60/233,662, filed Sep. 19, 2000.

BACKGROUND OF THE INVENTION

1. Field of the Invention

The present invention generally relates to fishing. More specifically, the invention relates to a plurality of metal lip jig rigs.

2. Description of the Related Art

Fishing has always been a favorite American pastime. With the advent of new plastics and materials, new fishing jigs have been developed that are better and more effective than older ones. Many of these new types of jigs and accessories are reflected in the related art as well.

U.S. Pat. No. 5,157,859 issued on Oct. 27, 1992, to Clarence L. Wirkus, describes a cast lead fishing jig comprising an upturned hook portion with a long shank imbedded in an oval shaped body of cast lead having a convex upper surface and a concave lower surface. The eye portion of the hook is bent at a right angle to protrude up from the body proximate its nose. A worm, leech or a plastic wriggler can be attached to the upturned hook portion. The jig is distinguishable for requiring an environmentally dangerous lead body made by casting around a bent hook.

U.S. Pat. No. 6,041,540 issued on Mar. 28, 2000, to Carl J. Potts, describes an artificial soft plastic fishing lure comprising three threaded fish strung on one line to simulate a school of bait fish. The fish have artificial eyes, a V-shaped dorsal fin, a dorsal rattle or fish-attracting scent in an elongated dorsal void space, and a ventral Y-shaped fiber weed guard. The artificial fishing lure is distinguishable for its requirement for various adornments, to say nothing of the fact that it is a lure, not a jig.

W.I.P.O. Patent Application No. WO/97/09875 published on Mar. 20, 1997, granted to Allen R. McDonald et al., describes a lead sinker coated with either rubber, plastic or latex and impregnated with fish oils. The lead sinker is distinguishable for being directed to only the lead sinker.

Although each of these fishing lures and accessories are novel and useful, what is really needed is an alternative to lead split shot sinkers and lead jigs that have been found to be hazardous to the environment. A replacement for these hazardous lead fishing lures and accessories would have a high demand and would be well-received in the marketplace.

None of the above inventions and patents, taken either singly or in combination, is seen to describe the instant invention as claimed. Thus a metal lip jig rig solving the aforementioned problems is desired.

SUMMARY OF THE INVENTION

The invention is a metal lip jig rig that has a metal lip with raised edges to help the metal lip jig rig sink and wobble when placed in water or let out and pulled in river current. The metal lip jig rig utilizes a number of fishing lure accessories such as artificial and live bait, feathers, Chenalle wire, spinner wire and other common fishing lure accessories. The metal lip jig rig is designed to replace lead split shot, sinkers and lead jigs.

Accordingly, it is a principal object of the invention to provide an environmentally friendly alternative to lead split shot, sinkers and lead jigs.

It is another object of the invention to provide fishing jigs that have elevated lip edges that produces a wobbling and sinking effect while in the water.

It is a further object of the invention to provide non-toxic fishing jigs with a variety of features such as weedless hooks, Chenalle wire, spurs, bucktail, feathers, hair, lips, baitholders and eyes.

Still another object of the invention is to provide fishing jigs with lips made from a variety of plastics and non-toxic metals.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
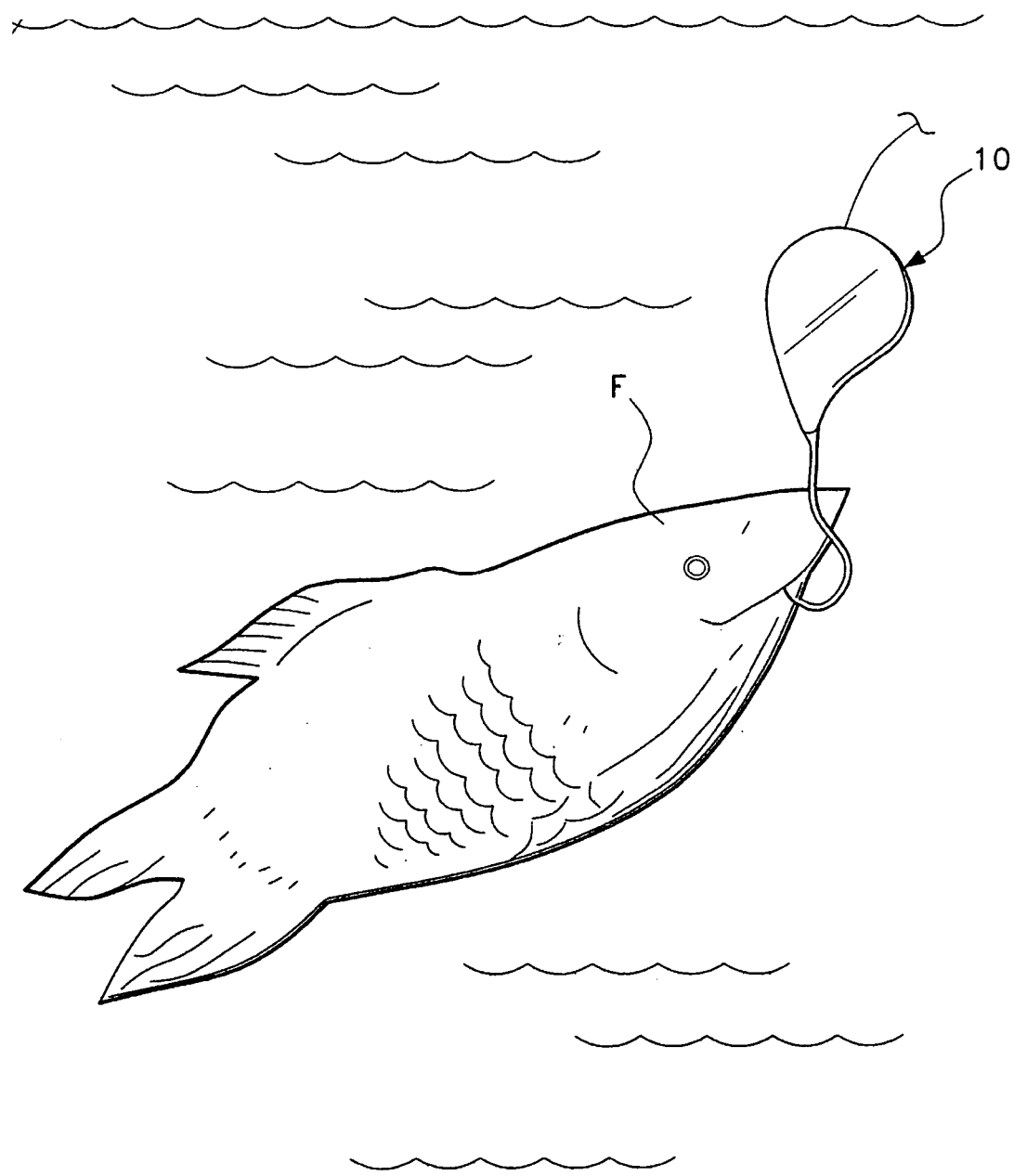
FIG. 1 is an environmental, perspective view of a metal lip jig rig according to the present invention.

The present invention is a metal lip jig rig 10 used with bait for fish F, as is depicted in FIG. 1.

Figure 2:
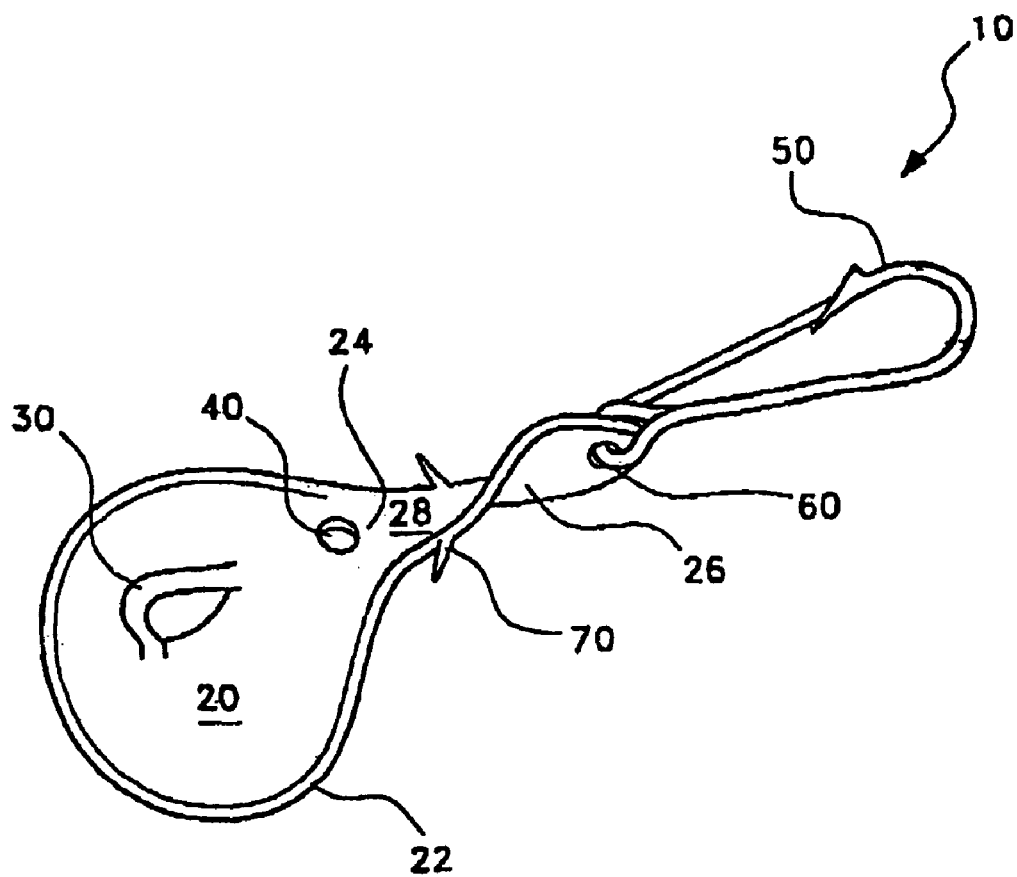
FIG. 2 is a front perspective view of the first embodiment of a metal lip jig rig.

As shown in FIG. 2, the metal lip jig rig 10 comprises a metal lip 20 with a top portion 24 and a bottom portion 26 to help the metal lip jig rig 10 sink and wobble when placed in water and also let out in river current. The metal lip jig rig 10 further comprises a punched out strap 30 that is used to receive a fishing line (not shown), a first aperture 40 on the top portion 24 of the metal lip 20 to potentially rivet a first hook 50 or a spinner wire (FIG. 5) to the metal lip jig rig 10. There is also a second aperture 60 on the bottom portion 26 of the metal lip 20 to potentially receive and hold a second hook (FIG. 3) and a plurality of spurs 70 on the area provided between the bottom portion 26 and the top portion 24 that can be wrapped around a third hook (FIG. 4) to potentially receive and hold a third hook (not shown). FIG. 2 illustrates the first embodiment of the metal lip jig rig 10 with a first hook 50, which is connected to the second aperture 60. The first hook 50 depicted on the metal lip jig rig 10 is a weedless hook.

Figure 3:
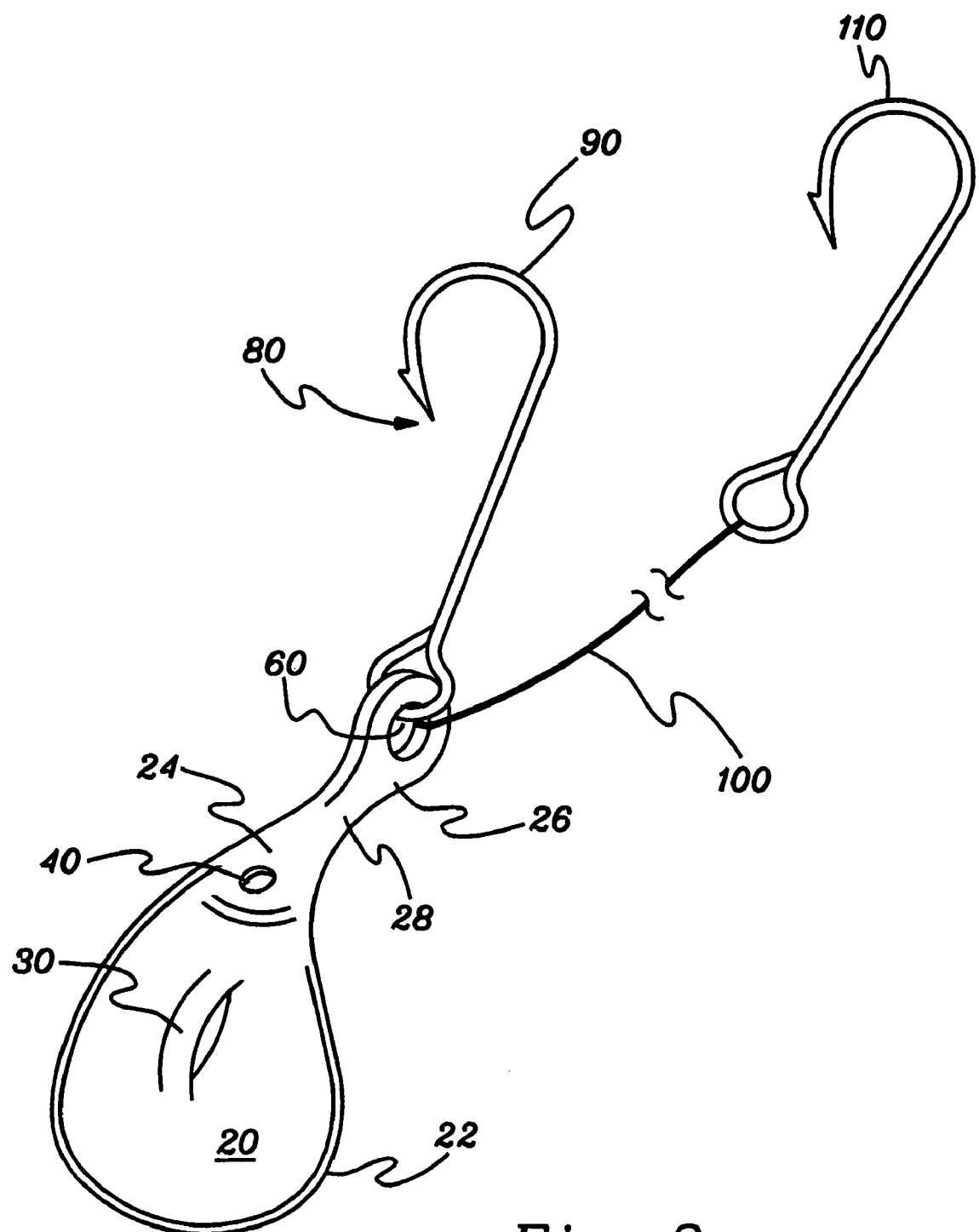
FIG. 3 is a front perspective view of the second embodiment of a metal lip jig rig.

FIG. 3 illustrates the second embodiment of the metal lip jig rig 80. The second embodiment of the metal lip jig rig 80 is different than the first embodiment of the metal lip jig rig 10 in that the area between the bottom portion and the top portion 28 is without spurs 70 and is twisted 90 degrees. A hook 90 is provided at the second aperture 60. The second embodiment of the metal lip jig rig 80 also has a lead line 100 and a second hook 110, which are provided at the second aperture 60. In this second embodiment 80, the metal lip 20 can act like a lead sinker (not shown), which it would safely replace.

Figure 4:
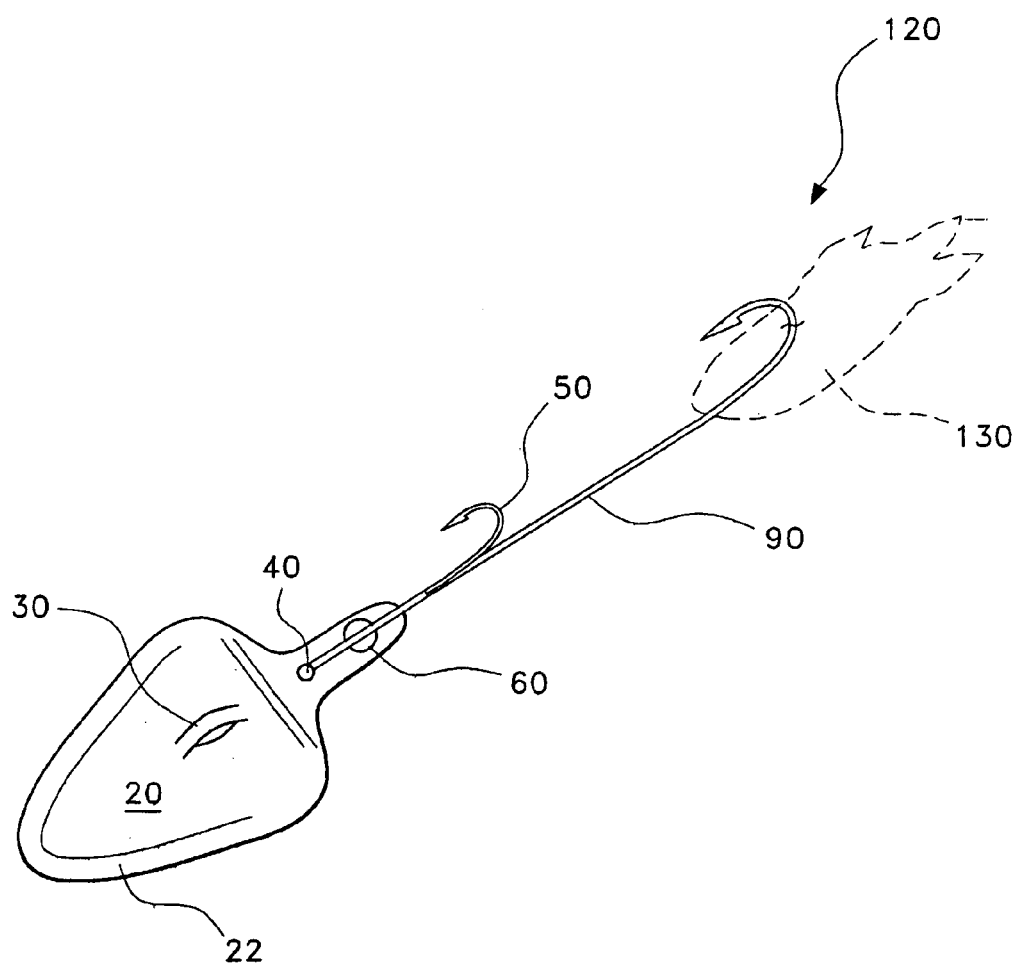
FIG. 4 is a front perspective view of the third embodiment of a metal lip jig rig.

FIG. 4 illustrates the third embodiment of the metal lip jig rig 120. The third embodiment of the metal lip jig rig 120 has a first hook 50 that is riveted at the first aperture 40 and a second hook 90 that holds an artificial bait (an artificial minnow 130). Other forms of artificial bait can include other soft plastic bait such as a soft plastic worm (not shown). The second hook 90 can also hold types of live bait as well such as cut bait, frozen bait, and live minnows (not shown).

Figure 5:
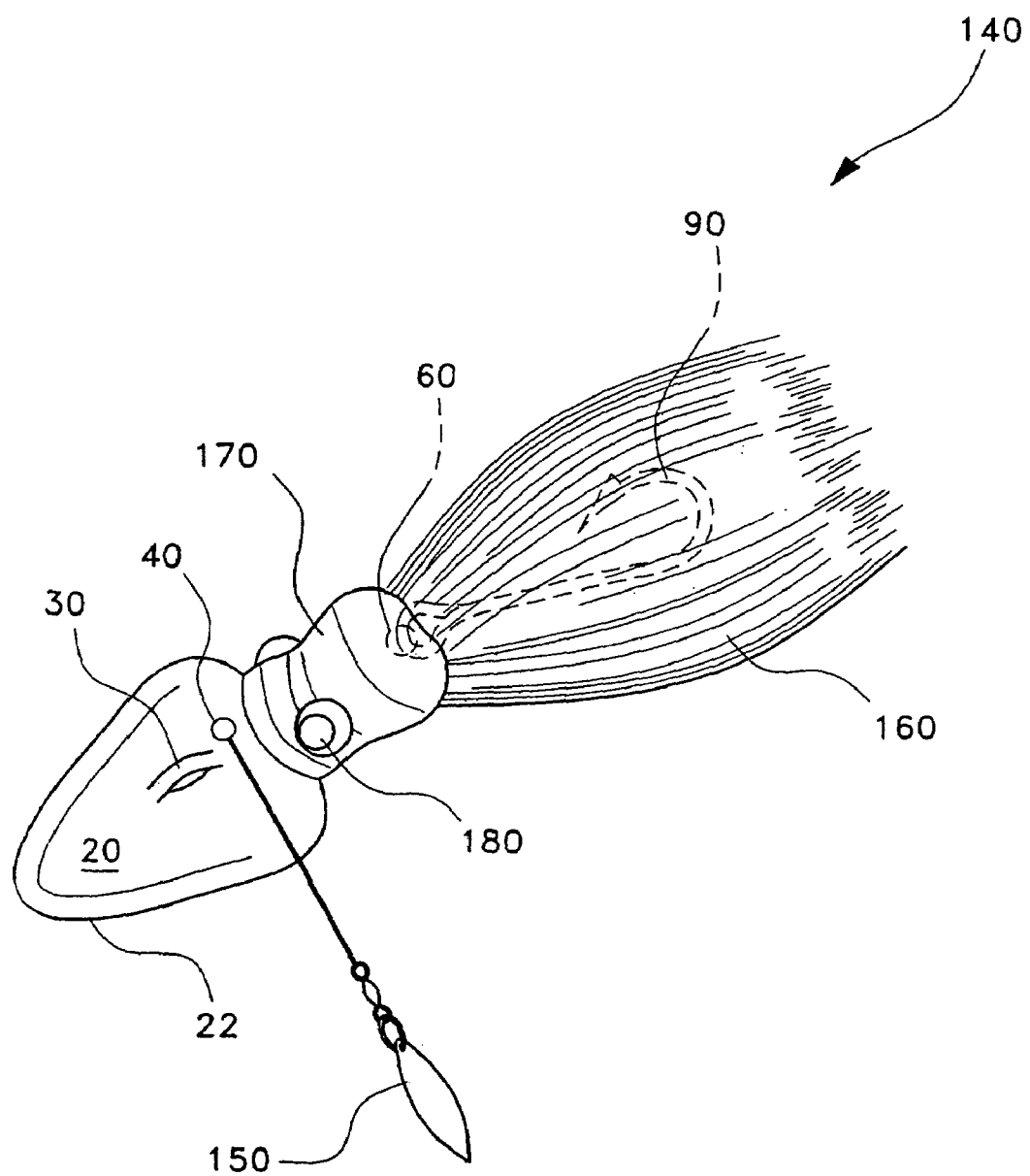
FIG. 5 is a front perspective view of the fourth embodiment of a metal lip jig rig.

FIG. 5 illustrates a fourth embodiment of the metal lip jig rig 140. This embodiment of the metal lip jig rig has a spinner wire 150 at the first aperture 40 and a hook 90 and feathers 160 provided therewith. Additionally, the area between the first aperture 40 and the second aperture 60 is provided with Chenalle wire 170 and artificial eyes 180. These fishing lure accessories are well-known to those that are schooled in the related art. Like all of the embodiments of the metal lip jig rig, the metal lip 20 provided has raised edges 22 and is used in lieu of lead sinkers and lead jigs (not shown).

Figure 6:
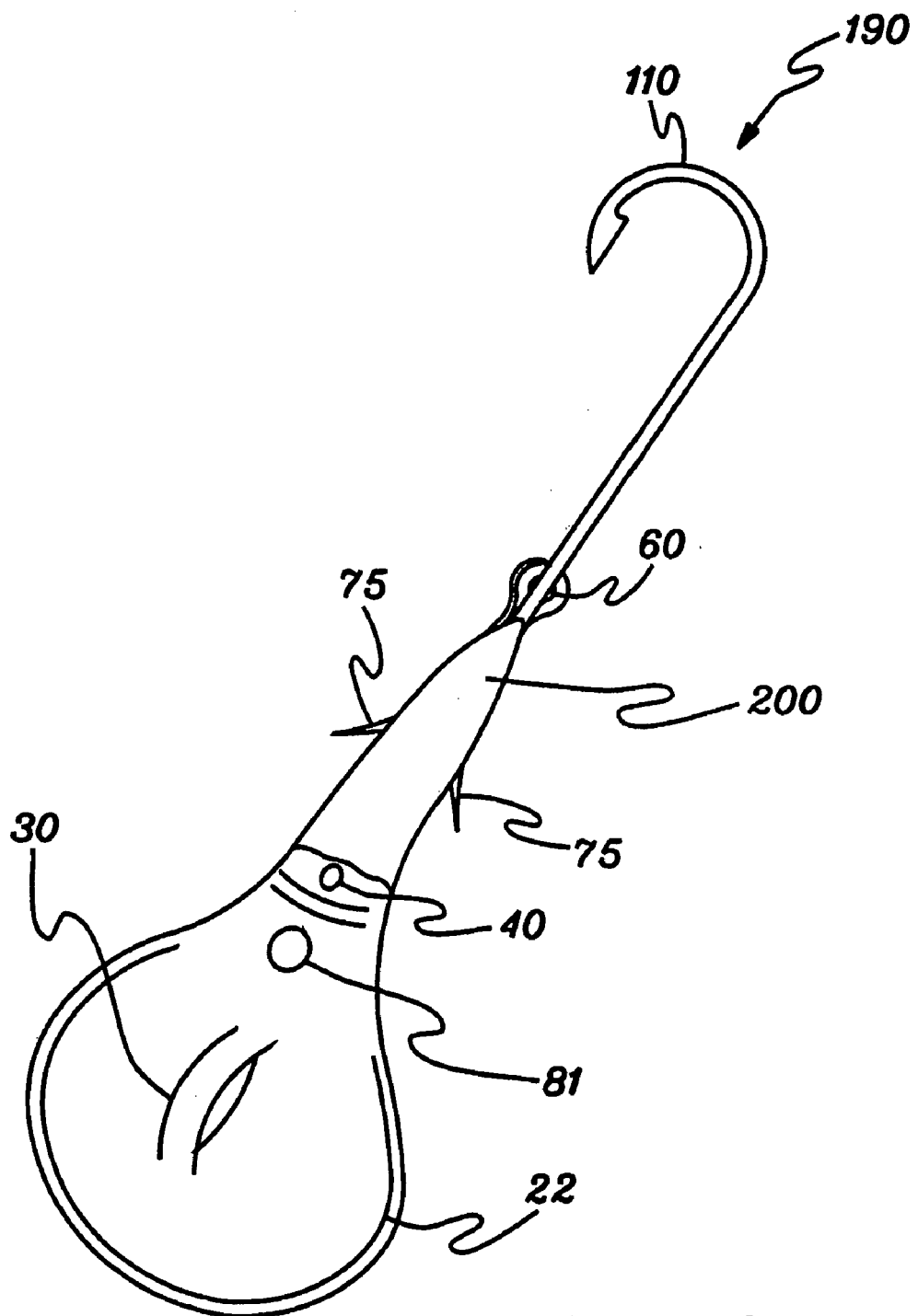
FIG. 6 is a front perspective view of the fifth embodiment of a metal lip jig rig.

FIG. 6 illustrates the fifth embodiment of the metal lip jig rig 190. The fifth embodiment of the metal lip jig rig 190 has an area 28 (See FIG. 3) between the first aperture 40 and the second aperture 60 that is an area molded over 200. Jig rig 190 may also have a third aperture 81. To accommodate the area molded over 200 at the area 28 between the first aperture 40 and the second aperture 60, the plurality of spurs 70 provided in the first embodiment of the metal lip jig rig 10 are replaced with bait holder 75. The plurality of spurs 70 are typically made of bendable wire that can hold a third hook (not shown) or bait, while bait holders 75 act like spikes, with bait being struck on the angled bait holder 75. The area molded over 200 is a smooth and clean surface that is produced with non-toxic metal or plastic polymer.

Use of the different embodiments of the metal lip jig rig 10,80,120,140,190 is not different than similar fishing jig rigs that do not have a metal lip 20 with raised edges 22. The metal lip 20 can come in a variety of sizes and colors to be more aesthetically pleasing to fish and to be in proper proportion with the rest of the different embodiments of the metal lip jig rig 10,80,120,140,190 and is usually in the shape of a teardrop or triangle head. The metal lip 20 is made from non-toxic metals (no lead) and can be replaced with a lip made with plastic polymers that are well-known to those schooled in the related art. The fishing line is attached to the different embodiments of the metal lip jig rig 10,80,120, 140,190 by tying the fishing line to the punched out strap 30 provided on the metal lip 20.

It is to be understood that the present invention is not limited to the embodiments described above, but encompasses any and all embodiments within the scope of the following claims.

I claim:

1. A lip jig rig, comprising:
   a lip, the lip having a front portion and a back portion to help the lip jig rig sink when placed in water, and the lip having a longitudinal axis extending between the front portion and the back portion;
   a punched out strap integral with the lip adapted to receive a fishing line, the punched out strap having two ends each attached to the lip, the punched out strap being defined between two longitudinally extending edges thereof which extend between the two ends and are raised above an upper surface of the lip, the punched out strap being oriented generally along the longitudinal axis of the lip;
   a first aperture on the front portion of the lip;
   a second aperture on the back portion of the lip;
   a hook attached to the lip at an area between the first aperture and the second aperture, wherein said hook is attached to the lip by a molded material encasing both an end of the hook and an area between the first and the second aperture; and
   a plurality of spurs on opposed lateral sides of the lip at the area between the back portion and the front portion of the lip, each of the plurality of spurs having a first end on the area between the first and the second aperture and a second pointed end spaced from the area between the first and second aperture, each of the plurality of spurs tapering from the first end to the second pointed end such that each spur projects from the molded material in a direction generally toward the front portion of the lip.

2. The lip jig rig according to claim 1, wherein the lip comprises a non-toxic metal.

3. The lip jig rig according to claim 1, wherein the lip comprises a plastic.

4. The lip jig rig according to claim 1, wherein the punched out strap comprises a strap protruding from the lip.

5. The lip jig rig according to claim 1, wherein the molded material comprises one of a non-toxic metal and a plastic polymer.

6. The lip jig rig according to claim 1, wherein the lip comprises raised edges.

7. The lip jig rig according to claim 1, wherein the lip rig jig is formed in the shape of one of a teardrop and a triangle.

8. The lip rig jig according to claim 1, wherein the plurality of spurs comprise bait holders.

9. The lip jig rig according to claim 8, wherein the bait holders are distinct from the hook.

10. The lip jig rig according to claim 1, wherein the plurality of spurs comprise a plurality of rigid projections from the lip.

11. The lip jig rig according to claim 10, wherein the plurality of rigid projections comprise a plurality of spikes.

12. The lip jig rig according to claim 1, wherein the punched out strap is elevated with respect to the lip.

13. A non-toxic fishing sinker comprising:
   a body comprising a broad lip portion with a rounded outer edge at a front portion of the body, the outer edge tapering to substantially parallel opposed lateral sides of a narrow elongated neck portion at a back portion of the body, and a longitudinal axis extending between the broad lip portion and the elongated neck portion;
   a first aperture at an end of the neck portion opposite the lip portion;
   a hook attached to the body at an area along the narrow neck portion, wherein said hook is attached to the body by molded material encasing an end of the hook and the area along the narrow neck portion;
   a plurality of rigid spurs projecting from the body on opposed lateral sides of the body, each of the plurality of spurs having a first end on the area along the narrow neck portion and a second pointed end spaced from the area along the narrow neck portion, each of the plurality of sours tapering from the first end to the second pointed end such that each spur projects from the molded material in a direction generally toward the broad lip portion at the front portion of the body;

a punched out strap integral with the lip adapted to receive a fishing line, the punched out strap having two ends each attached to the lip, the punched out strap being defined between two longitudinally extending edges thereof which extend between the two ends and are raised above an upper surface of the broad lip portion, the punched out strap being oriented generally along the longitudinal axis of the lip; and means for promoting sinking of the sinker when exposed to a flow of water.

14. The fishing sinker as recited in claim 13, wherein the means for promoting sinking comprises a raised edge on the broad lip portion.

15. The fishing sinker as recited in claim 13, wherein the means for promoting sinking comprises positioning the broad lip portion whereby the broad lip portion is non-planar with the narrow elongated neck portion.

16. The fishing sinker as recited in claim 13, wherein the means for promoting sinking further comprises means to promote wobbling of the sinker when exposed to a flow of water.

17. The fishing sinker as recited in claim 13, wherein the body further comprises at least one second aperture spaced from the first aperture.

18. The fishing sinker as recited in claim 17, wherein the at least one second aperture is positioned in the broad lip portion.

19. The lip jig rig according to claim 13, wherein the plurality of spurs are adapted to retain bait.

20. The fishing sinker as recited in claim 13, wherein the plurality of rigid spurs comprise a plurality of spikes.

* * * * *